United States Patent
Hayashi et al.

(10) Patent No.: US 10,610,943 B2
(45) Date of Patent: Apr. 7, 2020

(54) FLUX APPLYING METHOD AND FLUX APPLYING APPARATUS

(71) Applicant: Fujitsu Ten Limited, Kobe-shi (JP)

(72) Inventors: Hisaki Hayashi, Kobe (JP); Yasuyuki Watanabe, Kobe (JP)

(73) Assignee: FUJITSU TEN LIMITED, Kobe-Shi (JP)

( * ) Notice: Subject to any disclaimer, the term of this patent is extended or adjusted under 35 U.S.C. 154(b) by 19 days.

(21) Appl. No.: 15/633,451

(22) Filed: Jun. 26, 2017

(65) Prior Publication Data

US 2018/0001410 A1    Jan. 4, 2018

(30) Foreign Application Priority Data

Jun. 29, 2016  (JP) ................................ 2016-128325
Jun. 29, 2016  (JP) ................................ 2016-128326

(51) Int. Cl.
| | | |
|---|---|---|
| *B23K 3/08* | (2006.01) | |
| *B05B 7/04* | (2006.01) | |
| *B23K 1/00* | (2006.01) | |
| *B23K 1/20* | (2006.01) | |
| *B23K 101/42* | (2006.01) | |

(52) U.S. Cl.
CPC ............... *B23K 3/082* (2013.01); *B05B 7/04* (2013.01); *B23K 1/0016* (2013.01); *B23K 1/203* (2013.01); *B23K 2101/42* (2018.08)

(58) Field of Classification Search
None
See application file for complete search history.

(56) References Cited

U.S. PATENT DOCUMENTS

| | | | | |
|---|---|---|---|---|
| 3,135,630 A | * | 6/1964 | Bielinski | B23K 3/082 118/410 |
| 3,218,193 A | * | 11/1965 | Isaacson | B23K 3/082 118/429 |
| 4,158,076 A | * | 6/1979 | Wallsten | B05C 5/0262 118/410 |
| 4,684,544 A | * | 8/1987 | Arnett | B23K 3/082 118/74 |
| 4,796,558 A | * | 1/1989 | Chartrand | B23K 3/082 118/410 |

(Continued)

FOREIGN PATENT DOCUMENTS

| | | |
|---|---|---|
| JP | 60-60159 U | 4/1985 |
| JP | 61-21173 Y2 | 6/1986 |

(Continued)

OTHER PUBLICATIONS

Concise Explanation of the Relevance under 37 C.F.R. §1.98(a)(3), for Japanese Utility Patent No. 1-130582 U, published Sep. 5, 1989, and Japanese Utility Patent No. 1-118861 U, published Aug. 11, 1989, 1 page.

*Primary Examiner* — Binu Thomas
(74) *Attorney, Agent, or Firm* — Seed Intellectual Property Law Group LLP

(57) ABSTRACT

There is provided a flux applying method using a flux applying apparatus configured to jet and apply a flux to a target. The flux is supplied to a nozzle of the flux applying apparatus. A gas is applied to a foaming pipe with a porous filter included in the nozzle. The gas is jetted from the porous filter of the foaming pipe to the flux supplied to the nozzle, thereby jetting foamed flux to the target.

14 Claims, 5 Drawing Sheets

(56) References Cited

U.S. PATENT DOCUMENTS

| | | | | | |
|---|---|---|---|---|---|
| 4,871,105 | A | * | 10/1989 | Fisher | B23K 3/082 |
| | | | | | 239/61 |
| 4,934,307 | A | * | 6/1990 | Sumiyoshi | B23K 3/082 |
| | | | | | 118/410 |
| 5,005,766 | A | * | 4/1991 | Heiner | B23K 3/082 |
| | | | | | 239/214 |

FOREIGN PATENT DOCUMENTS

| | | |
|---|---|---|
| JP | 1-118861 U | 8/1989 |
| JP | 1-130582 U | 9/1989 |
| JP | 5-237651 A | 9/1993 |
| JP | 7-266031 A | 10/1995 |
| JP | 8-89865 A | 4/1996 |
| JP | 8-222842 A | 8/1996 |
| JP | 11-186703 A | 7/1999 |
| JP | 2000-114702 A | 4/2000 |
| JP | 2002-100857 A | 4/2002 |
| JP | 2015-24435 A | 2/2015 |

\* cited by examiner

FLUX APPLYING METHOD AND FLUX APPLYING APPARATUS

CROSS-REFERENCE TO RELATED APPLICATIONS

This application is based on and claims priority from Japanese Patent Application No. 2016-128325 filed on Jun. 29, 2016 and Japanese Patent Application No. 2016-128326 filed on Jun. 29, 2016.

TECHNICAL FIELD

The disclosure relates to a flux applying method and a flux applying apparatus.

RELATED ART

In the related art, a soldering has been widely used as a method of bonding metal components such as lands and through-holes formed on a surface of a printed board and lead lines of mounted components such as a semiconductor device and a capacitor mounted on the board so that energization can be enabled. As a pre-process of the soldering, a flux solution is applied. The flux solution is a liquid in which a rosin-based or acryl-based resin, an alcohol or aromatic solvent and an activator are mixed. The flux solution is uniformly applied to places in advance, at which the metal components and the mounted components are to be bonded by the soldering, on the printed board by a spray or the like, so that an oxide layer formed on the target places becomes reduced or removed. As a result, a clean adhesion surface is formed, wettability between the soldering and the metal surface is improved and the bonding becomes strong.

Patent Document 1: Japanese Patent Application Publication No. 2015-24435A
Patent Document 2: Japanese Utility Model Application Publication No. H1-130582U
Patent Document 3: Japanese Patent Application Publication No. 2000-114702A
Patent Document 4: Japanese Utility Model Application Publication No. S60-60159U
Patent Document 5: Japanese Utility Model Application Publication No. H1-118861U
Patent Document 6: Japanese Patent Application Publication No. H8-89865A
Patent Document 7: Japanese Patent Application Publication No. H11-186703A
Patent Document 8: Japanese Utility Model Examined Publication No. S61-21173Y
Patent Document 9: Japanese Patent Application Publication No. H8-222842A
Patent Document 10: Japanese Patent Application Publication No. H7-266031A
Patent Document 11: Japanese Patent Application Publication No. 2002-100857A There is a method of uniformly applying a necessary amount of flux to insides of the through-holes of the printed board. According to this method, for example, a flux applying apparatus is configured to submerge a porous filter referred to as a foaming pipe in a tank having a flux reserved therein, to foam the flux by pushing a gas into the foaming pipe and to apply the flux to the printed board.

According to the flux applying apparatus, since the flux in the tank is repetitively stirred by the foaming, a concentration of the flux becomes non-uniform and the flux in the tank contacts the atmosphere and is gradually deteriorated. Therefore, it is necessary to frequently replace the flux, so that a consumed amount of the flux increases and a discharged amount of the flux also increases. Also, since the printed board is immersed in the flux foamed in the tank, a surplus flux is applied to the printed board.

SUMMARY

It is therefore an object of the disclosure to provide a technology of suppressing deterioration of a flux when applying the flux.

In order to achieve the above object, the disclosure adopts following configurations.

According to an aspect of the embodiments of the present invention, there is provided a flux applying method using a flux applying apparatus configured to jet and apply a flux to a target, the method comprising: supplying the flux to a nozzle of the flux applying apparatus; supplying a gas to a foaming pipe with a porous filter included in the nozzle; and jetting the gas from the porous filter of the foaming pipe to the flux supplied to the nozzle, thereby jetting foamed flux to the target.

According to another aspect of the embodiments of the present invention, there is provided a flux applying apparatus configured to jet and apply a flux to a target, the flux applying apparatus comprising: a main tank configured to accommodate therein the flux; a piping configured to pass therethrough the flux which is to be transported from the main tank; and a nozzle comprising a foaming pipe with a porous filter and configured to jet a gas from the porous filter of the foaming pipe to the flux supplied via the piping, thereby jetting a foamed flux.

According to the disclosure, it is possible to provide the technology of suppressing deterioration of the flux when applying the flux.

BRIEF DESCRIPTION OF THE DRAWINGS

Exemplary embodiments of the present invention will be described in detailed based on the following figures, wherein.

DETAILED DESCRIPTION

Hereinafter, an illustrative embodiment of the disclosure will be described with reference to the drawings. The configurations of the illustrative embodiment are just exemplary and the disclosure is not limited thereto.

Illustrative Embodiment

Configuration Example

Figure 1:
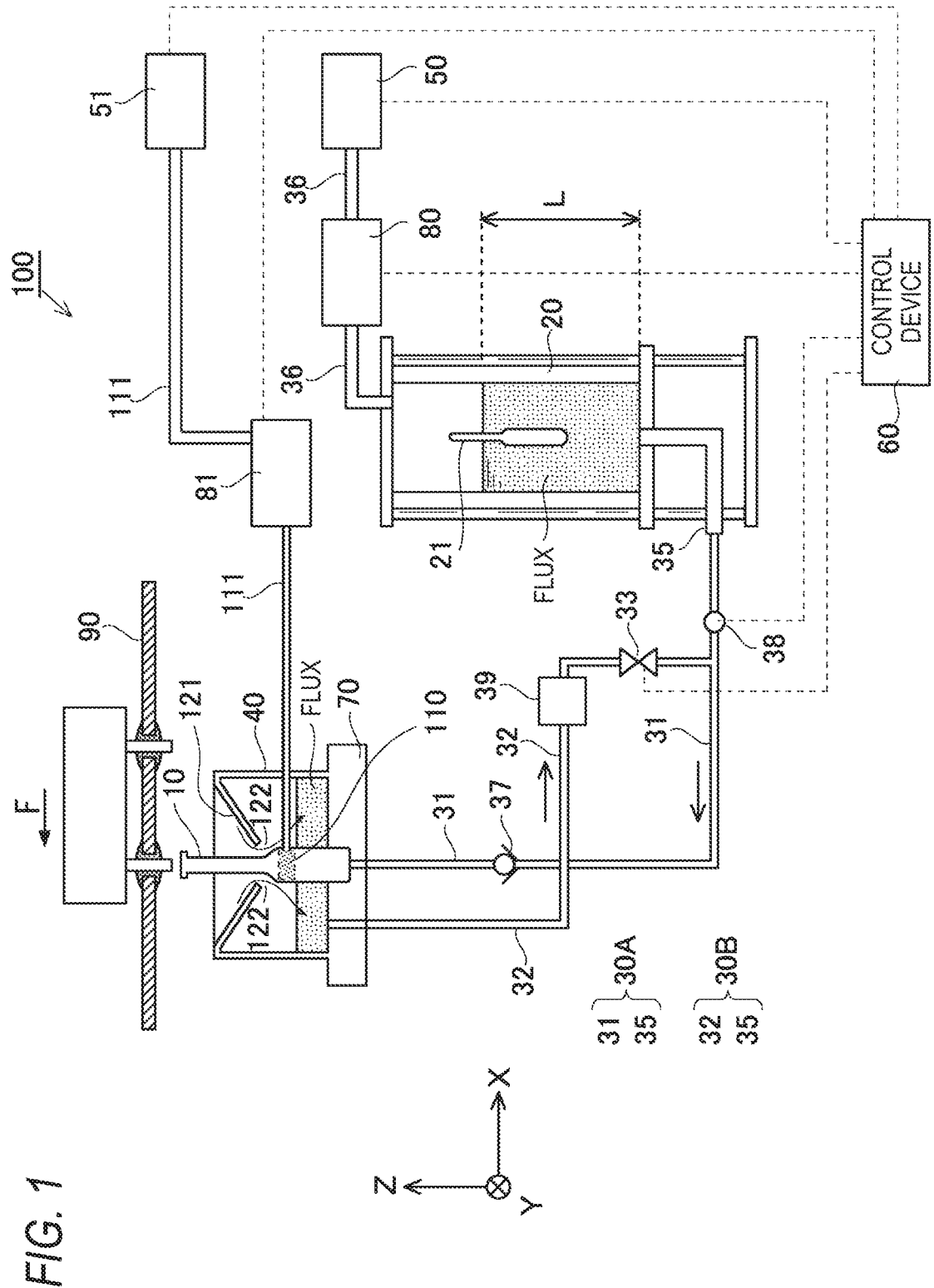
FIG. 1 depicts a configuration example of a flux applying apparatus in accordance with an illustrative embodiment.

FIG. 1 depicts a configuration example of a flux applying apparatus 100 in accordance with an illustrative embodiment. As shown in FIG. 1, the flux applying apparatus 100 includes a nozzle 10, a main tank 20, a specific gravity meter 21, a feed piping 31, a return piping 32, an opening and closing valve 33, a piping 35, a pressurization/depressurization piping 36, a check valve 37, a pressure sensor 38, a filter 39, a sub-tank 40, a pressurization/depressurization device 50, a pressurization/depressurization device 51, a control device 60, a base 70, a flowmeter 80, a flowmeter 81, a foaming pipe 110 and a gas piping 111. Herein, a rightward direction in FIG. 1 is referred to as +X direction, a direction from a front surface to a back surface of the drawing sheet of FIG. 1 is referred to as +Y direction, and an upward direction in FIG. 1 is referred to as +Z direction. An XY plane is a horizontal surface, and a −Z direction is a perpendicular direction.

The nozzle 10 is a cylindrical member and is set on the base 70 at a state where a tip portion having an opening (not shown) configured to discharge a flux faces upwards. Also, a rear end portion of the nozzle 10 is connected with the feed piping 31. Also, the foaming pipe 110 is connected to an intermediate part of the nozzle 10. The foaming pipe 110 is connected with the gas piping 111 configured to introduce a gas into the foaming pipe 110. The foamed gas can be supplied from the foaming pipe 110 into the nozzle.

The sub-tank 40 is provided with an opening configured to collect the flux facing upwards and has an outer diameter of a circular shape, as seen from a plan view (XY plane in FIG. 1), and the nozzle 10 is provided at a center thereof. Also, an upper part of the sub-tank 40 is provided with a cover part 121 having a mortar shape and inclined downwards from an outer periphery towards a central part, and a central portion of the cover part 121 is provided with an opening 122 configured to trap the flux.

The base 70 may be held at a movement unit (not shown) so as to be moveable in a vertical direction (Z-axis direction in FIG. 1) and in a horizontal direction (X and Y directions).

The main tank 20 is a tank configured to accommodate therein the flux, has a cylindrical shape of which an internal space configured to accommodate therein the flux is long in the vertical direction, and is connected at its upper part with the pressurization/depressurization piping 36 and at its lower part with the piping 35. In addition, the main tank 20 has a charging port (not shown) of the flux but is sealed except for the piping 35 and the pressurization/depressurization piping 36 when applying the flux.

The specific gravity meter 21 is provided in the main tank 21 and is configured to measure a specific gravity of a flux liquid. The specific gravity of the flux liquid depends on a quality of the flux liquid when the flux reaches a high concentration as a solvent volatilizes over time. For example, when the quality of the flux liquid is degraded, the specific gravity increases. The information about the specific gravity of the flux liquid measured by the specific gravity meter 21 is acquired by the control device 60. The quality of the flux liquid changes with changes in temperature, over time and the like.

The piping 35 has one end connected to the main tank 20 and the other end connected to the feed piping 31 and the return piping 32. In other words, the piping 35 is branched into the feed piping 31 and the return piping 32 at an opposite end portion to the main tank 20.

The pressure sensor 38 is provided on the way of the piping 35. The pressure sensor 38 is configured to measure a pressure (liquid pressure) to be applied to the flux in the piping 35. When the main tank 20 is at the atmospheric pressure without being sealed, the liquid pressure in the piping 35 is proportional to a height L of the liquid surface (upper surface) of the flux accommodated in the main tank 20. That is, it is possible to assume that when the liquid pressure in the piping 35 is high, the height L of the liquid surface is high and an empty capacity in the main tank 20 is small, and that when the liquid pressure in the piping 35 is low, the height L of the liquid surface is low and the empty capacity in the main tank 20 is large.

The check valve 37 is provided on the way of the feed piping 31. The check valve 37 is opened when the flux is pneumatically transported from the main tank 20 and is supplied to the nozzle 10, and is closed when the flux is not pneumatically transported towards the nozzle 10, so that it prevents the flux from flowing back from the nozzle 10 towards the main tank 20.

The opening and closing valve 33 is provided on the way of the return piping 32. The opening and closing valve 33 is opened when returning the flux from the sub-tank 40 to the main tank 20 via the return piping 32 and the piping 35 and is closed when sending the flux from the main tank 20 to the nozzle 10 via the piping 35 and the feed piping 31. The opening and closing valve 33 is an electromagnetic valve having a driving unit configured to open and close the same under control of the control device 60, for example. In the meantime, the opening and closing valve 33 may be a check valve that is closed by a pressure of the flux when the flux is pneumatically transported from the main tank 20 and is supplied to the nozzle 10 and is opened when the flux is collected from the nozzle 10 towards the main tank 20, not the electromagnetic valve.

The filter 39 is provided on the way of the return piping 32 between the opening and closing valve 33 and the sub-tank 40. The filter 39 is configured to remove foreign maters and impurities included in the flux to be collected from the sub-tank 40 to the main tank 20.

The piping 35 and the feed piping 31 configure an example of a feed pipe 30A for supplying the flux from the main tank 20 to the nozzle 10. Also, the return piping 32 and the piping 35 configure an example of a return pipe 30B for returning the flux from the sub-tank 40 to the main tank 20.

The pressurization/depressurization piping 36 has one end connected to the main tank 20 and the other end connected to the pressurization/depressurization device 50. The pressurization/depressurization device 50 is configured to pressurize an inside of the main tank 20 by sending a gas to the main tank 20 via the pressurization/depressurization piping 36. Also, the pressurization/depressurization device 50 is configured to depressurize the inside of the main tank 20 by sucking the gas from the main tank 20 via the pressurization/depressurization piping 36. Also, the pressurization/depressurization device 50 can enable the inside of the main tank 20 to be at a state where the pressurization and the depressurization are not performed, i.e., at the same pressure as a surrounding environment. For example, a pressure in the main tank 20 is set to an atmospheric pressure by enabling the inside and outside of the main tank 20 to communicate with each other. In the illustrative embodiment, the air is used as the gas that is to be used for pressurization and depressurization. However, the gas is not limited to the air and other gases such as nitrogen can also be used.

The pressurization/depressurization device 50 includes a device (blowing device) configured to transport the gas, such as a compressor, a blower, a syringe pump or the like, for example, and is configured to operate the blowing device to send the gas to the main tank 20, thereby performing the pressurization. At this time, the pressurization/depressurization device 50 can apply a predetermined gas pressure in the main tank 20 by adjusting an operation of the blowing device or adjusting a pressure adjustment valve (not shown) provided on a flow path of the gas to be sent. By the pressurization, the pressurization/depressurization device 50 is configured to set the pressure in the main tank 20 to 50 kPa to 100 kPa, for example. Herein, a value of the pressure is a relative value indicating a difference from the atmospheric pressure, rather than an absolute value. Therefore, when the pressure coincides with the atmospheric pressure, the value of the pressure is zero (0).

Also, the pressurization/depressurization device 50 has a device (vacuum generator) configured to suck the gas, such as a vacuum ejector, a vacuum pump, a vacuum blower, a syringe pump or the like, for example, and is configured to operate the vacuum generator to suck the gas from the main tank 20, thereby performing the depressurization. At this time, the pressurization/depressurization device 50 can form a predetermined negative pressure in the main tank 20 by adjusting an operation of the vacuum generator. For example, the pressurization/depressurization device 50 is configured to set the pressure in the main tank 20 to −200 kPa to −300 kPa, for example. The gas to be supplied into the main tank 20 is air, for example. Also, when nitrogen is used as the gas, it is possible to suppress oxidation of the flux liquid.

The flowmeter 80 is provided on the way of the pressurization/depressurization piping 36. The flowmeter 80 is configured to measure an amount of the gas to flow through the pressurization/depressurization piping 36.

Meanwhile, in the illustrative embodiment, the pressurization/depressurization device 50 and the main tank 20 are connected to each other by the pressurization/depressurization piping 36, a path along which the pressurization is to be performed and a path along which the depressurization is to be performed are configured by one path so as to simplify the device. However, the disclosure is not limited thereto, and a piping for pressurization and a piping for depressurization may be respectively provided between the pressurization/depressurization device 50 and the main tank 20.

The gas piping 111 has one end connected to the foaming pipe 110 in the nozzle 10 and the other end connected to the pressurization/depressurization device 51. The foaming pipe 110 has a porous filter. The porous filter includes a plurality of fine holes (for example, a diameter of about 1 μm to 10 μm) through which the gas is to pass. The foaming pipe 110 is configured to communicate the inside of the nozzle 10 and the gas piping 111 via the porous filter. The foaming pipe 110 is cylindrical, for example, and has one end blocked by the porous filter and the other opened end connected to the gas pipe 111. The cylindrical part of the foaming pipe 110 is formed by the porous filter. The pressurization/depressurization device 51 is configured to form bubbles in the flux in the nozzle 10 as the gas sent to the foaming pipe 110 via the gas pipe 111 passes through the porous filter.

The pressurization/depressurization device 51 includes a device (blowing device) configured to transport the gas, such as a compressor, a blower, a syringe pump or the like, for example, and is configured to operate the blowing device to send the gas to the foaming pipe 110. At this time, the pressurization/depressurization device 51 can control the generation of bubbles (foaming) in the foaming pipe 110 by adjusting an operation of the blowing device or adjusting a pressure adjustment valve (not shown) provided on a flow path of the gas to be sent. The gas to be supplied into the foaming pipe 110 is air, for example. Also, when nitrogen is used as the gas, it is possible to suppress oxidation of the flux liquid.

The flowmeter 81 is provided on the way of the gas piping 111. The flowmeter 81 is configured to measure an amount of the gas to flow through the gas piping 111.

The control device 60 is electrically connected to the opening and closing valve 33, the pressure sensor 38, the pressurization/depressurization device 50, the pressurization/depressurization device 51, the flowmeter 80 and the flowmeter 81 and is configured to control the opening and closing operation of the opening and closing valve 33 and the pressurization and depressurization operations of the pressurization/depressurization device 50 and the pressurization/depressurization device 51.

Figure 2:
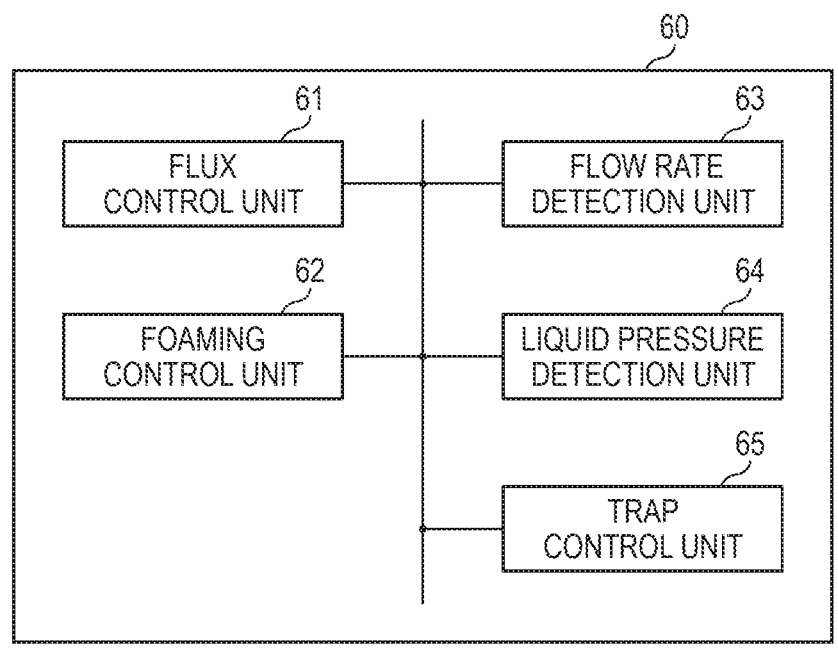
FIG. 2 depicts a function block of a control device.

FIG. 2 depicts a function block of the control device 60. As shown in FIG. 2, the control device 60 has a flux control unit 61, a foaming control unit 62, a flow rate detection unit 63, a liquid pressure detection unit 64 and a trap control unit 65.

The flux control unit 61 is configured to perform control of transmitting a control signal to the pressurization/depressurization device 50 to start the pressurization for setting the inside of the main tank 20 to a predetermined gas pressure (positive pressure) or to stop the pressurization, for example. Also, the flux control unit 61 is configured to perform control of transmitting a control signal to the pressurization/depressurization device 50 to start the pressurization for setting the inside of the main tank 20 to a predetermined negative pressure or to stop the pressurization, for example. Further, the flux control unit 61 is configured to perform control of transmitting a control signal to the pressurization/depressurization device 50 to set the inside of the main tank 20 to the atmospheric pressure, for example.

The foaming control unit 62 is configured to perform control of transmitting a control signal to the pressurization/depressurization device 51 to start the pressurization for setting the inside of the foaming pipe 110 to a predetermined gas pressure (positive pressure) or to stop the pressurization, for example.

The flow rate detection unit 63 is configured to acquire a flow rate of the gas to flow through the pressurization/depressurization piping 36, from the flowmeter 80 provided for the pressurization/depressurization piping 36. The flow rate detection unit 63 is configured to acquire a flow rate of the gas to flow through the gas piping 36, from the flowmeter 81 provided for the gas piping 111.

The liquid pressure detection unit 64 is configured to acquire a liquid pressure of the flux to flow through the piping 35, from the pressure sensor 38 provided for the piping 35.

The trap control unit 65 is configured to estimate a flux amount trapped in the sub-tank on the basis of a jetting time of the flux, the flow rate of the gas to flow through the pressurization/depressurization piping 36, the flow rate of the gas to flow through the gas pipe 111, and the like, and to set a time period (hereinafter, referred to as negative pressure generation time) for which the inside of the main tank is set to the negative pressure, based on the estimated flux amount. The depressurization control unit 62 is configured to start the depressurization for setting the inside of the main tank 20 to a predetermined negative pressure and to stop the depressurization when elapse time from the start of the depressurization reaches the negative pressure generation time. The trap control unit 65 is configured to obtain the negative pressure generation time, based on a following equation 1, for example.

(negative pressure generation time $T$)= $k \times$(jetting time $t$)$+\alpha$  (equation 1)

In the equation 1, the coefficient k is a value relating to a flow rate of the flux, which is to be set on the basis of a diameter of an injection port of the nozzle 10, a pressure (positive pressure) to be applied to the main tank 20, a viscosity of the flux and the like. Also, the constant α is a value relating to collection time that is normally required for one time collection set on the basis of a length and a dimeter of a flow path of the flux, an internal capacity of the main tank 20 and the like. In the illustrative embodiment, the coefficient k is 0.13 and the constant α is 1.79.

Figure 3:
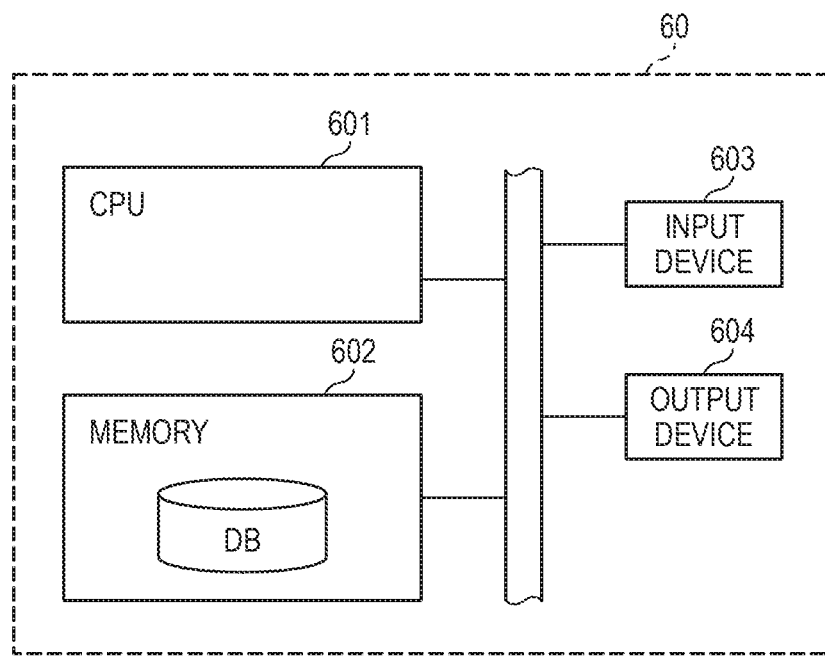
FIG. 3 depicts a hardware configuration of the control device.

FIG. 3 depicts a hardware configuration of the control device 60. As shown in FIG. 3, the control device 60 includes a memory 602, an input device 603 and an output device 604, which are connected to a CPU 601 via a bus.

The memory 602 includes a main storage device and an auxiliary storage device. The main storage device is used as a work area of the CPU 601, a storage area of programs and data, and a buffer area of communication data. The main storage device is configured by a Random Access Memory (RAM) or a combination of the RAM and a Read Only Memory (ROM).

The auxiliary storage device is configured to store therein a program that is to be executed by the CPU 601 and data that is to be used when executing the program. The auxiliary storage device is a hard disk drive (HDD), a Solid State Drive (SSD), a flash memory, an Electrically Erasable Programmable Read-Only Memory (EEPROM) or the like, for example. Also, the auxiliary storage device includes a portable storage medium that is to be detachably mounted to the control device 60.

The input device 603 is used so as to input setting information and data to the control device 60. The input device 603 may include a button, a key, a touch panel, a jumper, a variable resistor and the like.

The output device 604 is configured to output the information and the data. The output device 604 is a display device, a writing device to a storage medium, a speaker, an indicator, a warning lamp or the like, for example.

Some of the above configurations may be omitted or a configuration may be added, as necessary. For example, when it is not necessary to output the information, the output device 604 may be omitted. Also, when performing communication with other apparatus, when inputting the setting information and the like from the other apparatus or when transmitting information such as an operating status to the other apparatus, a communication interface may be added.

In the illustrative embodiment, the CPU 601 corresponds to a processing device. The CPU 601 is also referred to as an MPU (Micro Processor Unit), a microprocessor or a processor. The CPU 601 is not limited to a single processor and may have a multi-processor configuration. Also, a single CPU connected with a single socket may have a multi-core configuration. At least some processing of the respective units may be performed by a processor except for the CPU, for example, a dedicated processor such as a Digital Signal Processor (DSP), a Graphics Processing Unit (GPU), a numeric calculation processor, a vector processor, an image processing processor or the like. Also, at least some processing of the respective units may be performed by an integrated circuit (IC) or other digital circuit. Also, at least some of the respective units may include an analog circuit. The integrated circuit includes an LSI, an Application Specific Integrated Circuit (ASIC) and a programmable logic device (PLD). The PLD includes a Field-Programmable Gate Array (FPGA), for example. Each unit may be a combination of a processor and an integrated circuit. The combination is also referred to as an MCU (Micro Controller Unit), an SoC (System-on-a-chip), a system LSI, a chipset or the like.

The CPU 601 is configured to load a program stored in the memory 602 into the main storage device and to execute the same. In the memory 602, programs such as an operating system, firmware and the like are installed.

The CPU 601 is configured to execute programs, thereby functioning as the flux control unit 61, the foaming control unit 62, the flow rate detection unit 63, the liquid pressure detection unit 64 and the trap control unit 65.

<Configuration Example of Nozzle>

Figure 4:
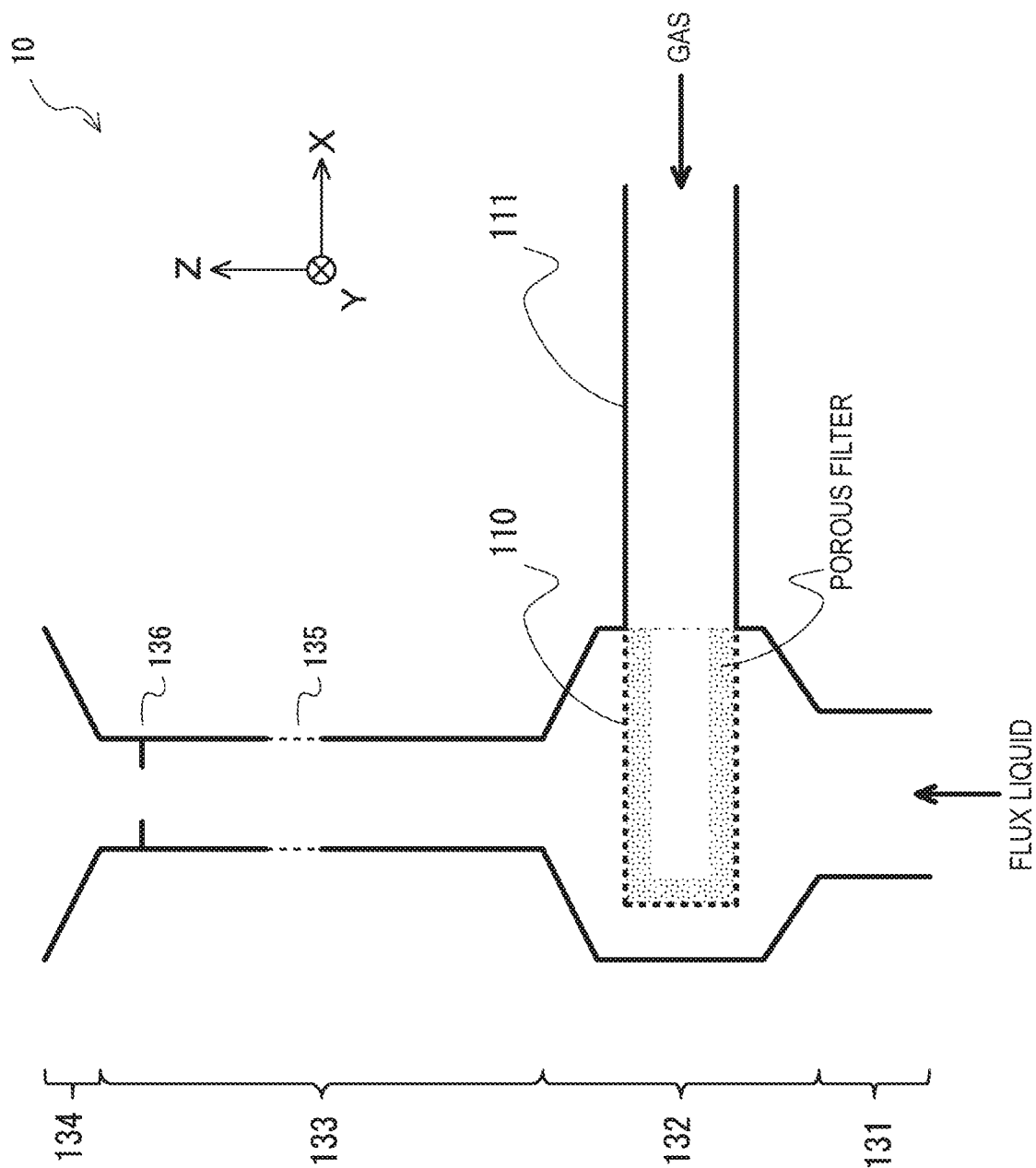
FIG. 4 depicts a configuration example of a nozzle.

FIG. 4 depicts a configuration example of the nozzle 10. The nozzle 10 includes a flux introduction portion 131, a foaming portion 132, a foamed flux conveying portion 133 and a tip portion 134. The flux introduction portion 131 is cylindrical and has one end connected to the main tank 20-side (piping 31) and the other end connected to the foaming portion 132. The foaming portion 132 includes the foaming pipe 110. The foaming pipe 110 is connected to the gas pipe 111. The foaming pipe 110 is fixed to the foaming portion 132. The foaming pipe 110 and the foaming portion 132 are fixed by screws threaded to an outer side of the foaming pipe 110 and a side surface of the foaming portion 132 so that the flux liquid is not to leak from between the foaming pipe 110 and the foaming portion 132.

The foamed flux conveying portion 133 is cylindrical and has one end connected to the foaming portion 132 and the other end connected to the tip portion 134. The foamed flux conveying portion 133 includes a release hole 135 formed in a sidewall on the way thereof. One or more release holes 135 may be formed. The foamed flux overflowing from the conveying portion 133 is discharged from the release hole 135. The cylindrical foamed flux conveying portion 133 includes a throttle hole 136 therein. The throttle hole 136 has a shape in which a hole having a diameter smaller than an inner diameter of the cylinder is formed at a center of a disc configured to block the cylinder in the cylinder and having the same diameter as the inner diameter of the cylinder perpendicular to a length direction of the cylinder. The throttle hole 136 is formed between the tip portion 134 and the release hole 135. An amount of the foamed flux to be discharged to the tip portion 134 is limited by the throttle hole 136. Also, it is possible to stabilize a shape and a height of the foamed flux by the throttle hole 136. The flux introduction portion 131 and the foamed flux conveying portion 133 are preferably concentric with each other.

The tip portion 134 expands upwards in a taper shape and has one end connected to the foamed flux conveying portion 133 and the other opened end. The foamed flux is reserved in the tip portion 134. The tip portion 134 may be omitted.

(Applying of Flux)

A method of applying the flux by the flux applying apparatus 100 is described.

The nozzle 10 of the flux applying apparatus 100 is arranged below a printed board 200 that is a flux applying target. When the inside of the main tank 20 is pressurized by the pressurization/depressurization device 50 and the flux is pneumatically transported to the nozzle 10, the flux is pushed upwards in the nozzle 10. Also, the gas is sent to the foaming pipe 110 provided in the nozzle 10 via the gas pipe 111 by the pressurization/depressurization device 51. The bubbles are sent to the flux in the nozzle 10 from the fine holes of the foaming pipe 111, so that a foamed flux is formed in the nozzle 10. The foamed flux is jetted upwards from the tip of the nozzle 10. Also, the nozzle 10 is formed with the release hole between a tip of a board-side and the foaming pipe 110, so that a surplus foamed flux is discharged.

The foamed flux reaches a position higher than the tip of the nozzle 10 by a jetting pressure and is then dropped downwards. That is, since the foamed flux jetted from the nozzle 10 forms a jetting stream so as to be convex upwards from the tip of the nozzle 10, the jetting stream of the foamed flux is contacted to the target, so that the flux is applied to the target. A height (a distance (Z direction) to a position of the foamed flux most distant outwards from the tip of the nozzle 10) of the foamed flux to be jetted can be controlled by a pressure of the flux liquid and a pressure in the foaming pipe 110. The height of the foamed flux depends on the specific gravity of the flux liquid, the pressure of the flux liquid and the pressure in the foaming pipe 110. In the meantime, a foamed flux jetted from the tip of the nozzle 10 and not applied to the target and a foamed flux to be discharged from the release hole (hereinafter, also referred to as surplus flux) are dropped downwards and trapped into the sub-tank 40. For example, the surplus flux descends along an outer wall of the nozzle 10 and is accommodated into the sub-tank 40 from the opening 122.

The printed board 200 is conveyed in a predetermined conveying direction F by a conveyor apparatus (not shown) and the nozzle 10 is moved in the X-axis, Y-axis and Z-axis directions by a movement unit (not shown), so that the nozzle is positioned at a predetermined applying position and the applying is repeatedly performed. In the meantime, since the movement unit of the nozzle 10 is well-known, the detailed description thereof is omitted.

When the applying is completed for one printed board 200, the flux trapped in the sub-tank 40 is collected into the main tank 20 until a next printed board is conveyed and the nozzle 10 is moved to a position at which the applying for the printed board starts.

Figure 5:
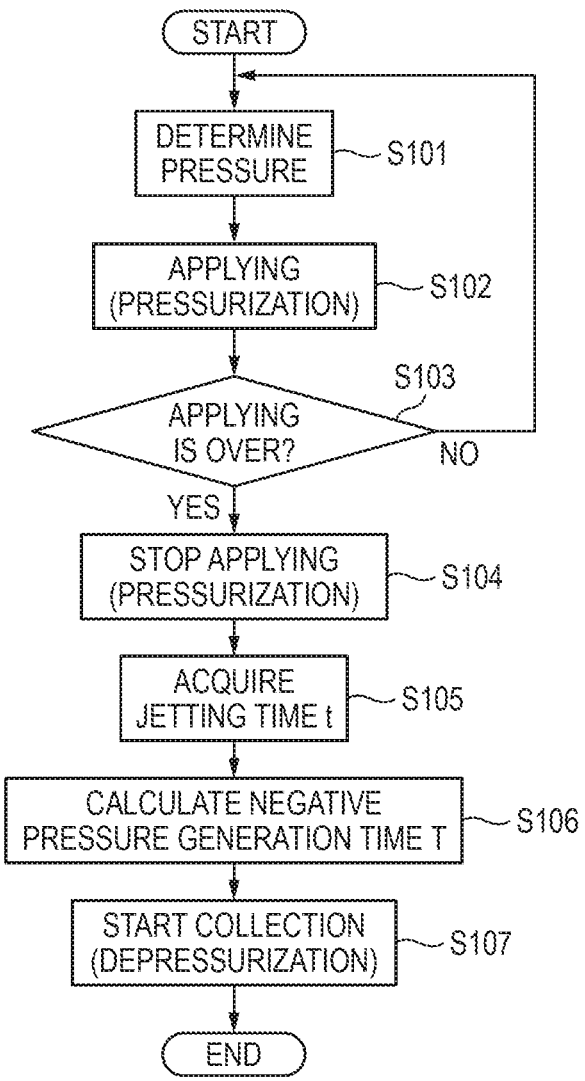
FIG. 5 depicts an operation flow of flux applying processing that is to be executed by the control device.
Figure 6:
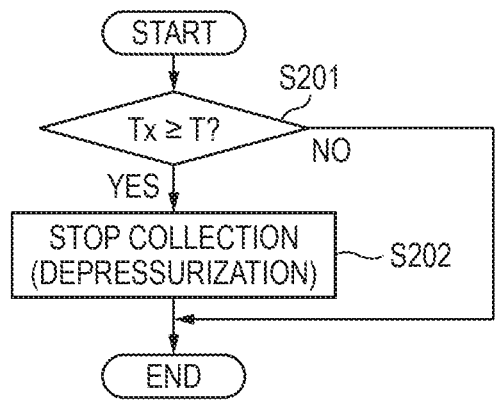
FIG. 6 depicts an operation flow of processing of ending flux collection.

FIG. 5 depicts an operation flow of flux applying processing that is to be executed by the control device 60. FIG. 6 depicts an operation flow of processing of ending flux collection.

When it is notified from the movement unit that the nozzle 10 has reached the predetermined applying position, the operation flow of FIG. 5 is executed.

In S101, the flux control unit 61 of the control device 60 acquires a flow rate of the gas flowing through the pressurization/depressurization piping 36 and a flow rate of the gas flowing through the gas pipe 111, from the flow rate detection unit 63. The flux control unit 61 acquires a specific gravity of the flux liquid from the specific gravity meter 21. The flux control unit 61 determines a pressure, which is to be applied to the main tank 20 so as to set a height of the foamed flux to a desired height, based on the specific gravity of the flux liquid, the flow rate of the gas flowing through the pressurization/depressurization piping 36 and the flow rate of the gas flowing through the gas pipe 111. Also, the foaming control unit 62 of the control device 60 acquires the flow rate of the gas flowing through the pressurization/depressurization piping 36 and the flow rate of the gas flowing through the gas pipe 111, from the flow rate detection unit 63. The foaming control unit 62 acquires the specific gravity of the flux liquid from the specific gravity meter 21. The foaming control unit 62 determines a pressure, which is to be applied to the inside of the gas pipe 111 so as to set a height of the foamed flux to a desired height, based on the specific gravity of the flux liquid, the flow rate of the gas flowing through the pressurization/depressurization piping 36 and the flow rate of the gas flowing through the gas pipe 111. The height of the foamed flux decreases as the specific gravity of the flux liquid increases. Also, the height of the foamed flux increases as the pressure (the liquid pressure of the flux liquid) in the main tank 20 and the pressure in the foaming pipe 110 increase. Therefore, the control device 60 can control the height of the foamed flux by controlling the pressure in the main tank 20 and the pressure in the foaming pipe 110 while monitoring the specific gravity of the flux liquid. That is, it is possible to control the height of the foamed flux constant, irrespective of the quality of the flux liquid (property value). Also, when the specific gravity of the flux liquid is constant, the control device 60 can control the height of the foamed flux by controlling the pressure in the main tank 20 and the pressure in the foaming pipe 110. The height of the foamed flux becomes stable, so that a bubble shape of the foamed flux becomes stable. The bubble shape becomes stable, so that it is possible to uniformly apply the flux to the board. Also, herein, when the flow rate of the gas flowing through the pressurization/depressurization device 36 or the gas pipe 111 is zero (0), the control device 60 determines that an abnormality has occurred (for example, the piping or the foaming pipe is clogged) and stops the processing of the operation flow. Also, the flux control unit 61 may detect the liquid pressure in the piping 35 from the liquid pressure detection unit 64 and determine a pressure to be applied by the pressurization/depressurization device 50 so that the liquid pressure becomes a predetermined value.

In S102, the flux control unit 61 of the control device 60 transmits a control signal to the pressurization/depressurization device 50 to start the pressurization so that the pressurization is to be performed with the pressure determined in S101. Also, the foaming control unit 62 of the control device 60 transmits a control signal to the pressurization/depressurization device 51 to start the pressurization so that the pressurization is to be performed with the pressure determined in S101.

In S103, the flux control unit 61 of the control device 60 determines whether the applying is over. Regarding the determination as to whether the applying is over, when it is detected that a predetermined operating state has come as the applying is performed, for example when the elapse time from the start of the applying reaches predetermined time, when it is notified from the movement unit that the nozzle 10 has reached a final applying position or the like, it is determined that the applying is completed. When it is determined that the applying is over (step S103, YES), the processing proceeds to S104. On the other hand, when it is determined that the applying is not over (step S103, NO), the processing returns to S101.

In S104, the flux control unit 61 enables the pressurization/depressurization device 50 to stop the pressurization. At this time, the foaming control unit 62 continues the pressurization without enabling the pressurization/depressurization device 51 to stop the pressurization. The pressurization to the foaming pipe continues, so that the foaming pipe 110 is prevented from being clogged due to the introduction of the flux into the foaming pipe 110.

In S105, the trap control unit 65 of the control device 60 acquires a time period for which the pressurization has been performed from the pressurization/depressurization device 50 to the main tank 20, i.e., the jetting time. The jetting time is calculated from the time at which the pressurization/depressurization device 50 has been enabled to start the pressurization and the time at which the pressurization/depressurization device 50 has been enabled to stop the pressurization.

In S106, the trap control unit 65 estimates the flux amount trapped in the sub-tank 40 on the basis of the jetting time and sets the negative pressure generation time T for which the inside of the main tank 20 is to be set to the negative pressure, on the basis of the estimated flux amount.

In S107, the trap control unit 65 transmits a control signal for opening the opening and closing valve 33 to the opening and closing valve 33, thereby opening the opening and closing valve 33. Also, the trap control unit 65 enables the pressurization/depressurization device 50 to start the depressurization. That is, the inside of the main tank 20 is set to the negative pressure and the flux in the sub-tank 40 is collected to the main tank 20 via the return piping 32 and the piping 35.

The operation flow of FIG. 6 is executed after the operation flow of FIG. 5.

In S201, the trap control unit 65 of the control device 60 determines whether elapse time Tx from the start of the depressurization has reached the negative pressure generation time T set in S106, i.e., whether the collection is over. When it is determined that the elapse time Tx has not reached the negative pressure generation time T (the collection is not over) (step S201, NO), the control device ends the processing of FIG. 6 and periodically executes the processing of FIG. 6 to monitor whether the collection is over. When it is determined that the elapse time Tx has reached the negative pressure generation time T (the collection is over) (step S201, YES), the processing proceeds to S202.

In S202, the trap control unit 65 transmits a control signal for stopping the depressurization to the pressurization/depressurization device 50, stops the depressurization, sets the inside of the main tank 20 to the atmospheric pressure and ends the flux collection. In the meantime, when the inside of the main tank 20 is kept at the negative pressure simply by stopping the depressurization, the inside of the main tank 20 and the outside of the main tank may be made to communicate with each other by using a vacuum breaker or the like so that the inside of the main tank 20 is to be returned to the atmospheric pressure. Also, the trap control unit 65 transmits a control signal for closing the opening and closing valve 33 to the opening and closing valve 33, thereby closing the opening and closing valve 33. The opening and closing valve 33 is closed, so that the flux is not directly supplied from the main tank 20 to the sub-tank 40 when applying the flux.

(Operations and Effects of Illustrative Embodiment)

According to the flux applying apparatus 100, the main tank 20 is pressurized or depressurized to pneumatically transport or collect the flux. Therefore, it is not necessary to provide a pump on the flow path of the flux, so that it is possible to prevent the flux from being pulsated and an impeller from being fixed.

Also, according to the flux applying apparatus 100, instead of waiting that the surplus flux trapped in the sub-tank 40 returns to the main tank 20 by the natural dropping, the inside of the main tank 20 is set to the negative pressure to suck the surplus flux, so that it is possible to rapidly collect the surplus flux from the sub-tank 40. Thereby, since it is possible to rapidly make preparations for a next applying, it is possible to speed up the manufacturing process. Also, it is possible to shorten the staying time of the surplus flux in the sub-tank, so that it is possible to suppress deterioration of the flux resulting from volatilization of a solvent or the like at a minimum, thereby improving the reliability of the manufacturing process.

Also, the flux applying apparatus 100 is configured to estimate the flux amount trapped in the sub-tank 40 on the basis of the time period (jetting time) for which the flux is jetted from the nozzle 10 and to control the applying time of the negative pressure on the basis of the estimated flux amount, upon the collection of the surplus flux. For example, when collecting the surplus flux, if the inside of the main tank 20 is continuously set to the negative pressure, the gas is sucked from a collection tank and the flux flows back to a negative pressure generator. Therefore, in the illustrative embodiment, it is possible to set the optimal applying time of the negative pressure on the basis of the remaining amount of the flux in the sub-tank 40, to minimize the flux amount in the sub-tank 40 and to prevent the air from being included into the main tank 20. In the meantime, when preventing the air from being included into the main tank 20, a method of stopping the negative pressure before the air is included into the main tank by using a sensor or the like is considered. However, in this case, a malfunction may be caused due to bubbles of the flux, or the like. Regarding this, according to the flux applying apparatus 100 of the illustrative embodiment, the time period for which the main tank 20 is set to the negative pressure is set on the basis of the jetting time. Therefore, it is not necessary to provide the sensor and to precisely collect a necessary amount of the flux with a simple configuration.

The flux applying apparatus 100 is configured to measure the flow rates of the gas to flow through the pressurization/depressurization piping 36 and the gas pipe 111 by the flowmeter 80 and the flowmeter 81, to monitor the pressures in the pressurization/depressurization piping 36 and the gas pipe 111 and to control the pressurization/depressurization device 50 and the pressurization/depressurization device 51 in a feedback manner, so that it is possible to control the height of the foamed flux to be constant all the time.

The flux applying apparatus 100 is configured to measure the flow rates of the gas to flow through the pressurization/depressurization piping 36 and the gas pipe 111 by the flowmeter 80 and the flowmeter 81, thereby detecting the clogging of the piping during the flux applying, for example. Thereby, it is possible to prevent a defective product in which the flux has not been applied to the board.

According to the flux applying apparatus 100, when collecting the flux after the applying, the foreign matter and impurities are removed by the filter 39. Therefore, it is possible to always provide the clean flux.

According to the flux applying apparatus 100, the flux is circulated by the pressure of the gas, without using a pump. Therefore, a pump malfunction does not occur, so that it is possible to reduce the labor on the maintenance.

Figure 7:
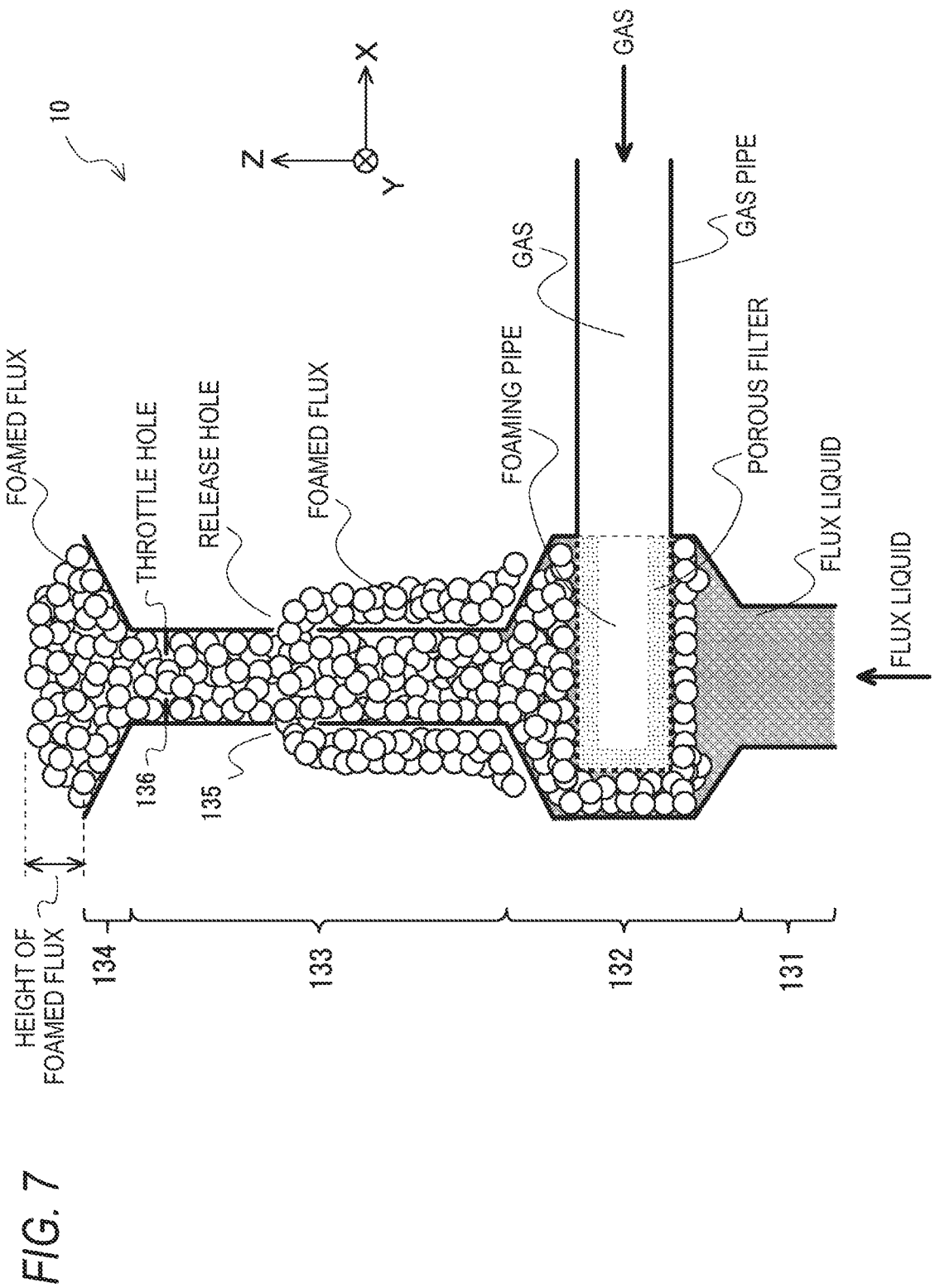
FIG. 7 depicts an example of generation of foamed flux in the nozzle.

FIG. 7 depicts an example of generation of the foamed flux in the nozzle. The flux from the main tank 20 is introduced from the flux introduction portion 131 and the gas from the gas pipe 111 is introduced from the foaming pipe 110 fixed to the inside of the foaming portion 132. In the foaming portion 132, the fine gas having passed through the porous filter of the foaming pipe 110 is introduced into the flux sent from the flux introduction portion 131, so that foamed flux is generated. The generated foamed flux passes through the foamed flux conveying portion 133 and is reserved in the tip portion 134. The height of the foamed flux depends on the pressure of the flux liquid, the gas pressure in the foaming pipe 110, the specific gravity of the flux liquid and the like. Therefore, even when the foamed flux is more generated than an amount that the foamed flux reserved in the tip portion 134 is to be attached to the board or the like, the height of the foamed flux little changes. The surplus foamed flux is discharged through the release hole 135. The height of the foamed flux is kept, so that it is possible to stabilize the amount of the flux to be attached to the board. Also, the release hole 135 is provided. Therefore, when applying the flux to the board, even though the tip portion 134 comes close to the board, so that the board is pressed to the foamed flux reserved in the tip portion 134 and the foamed flux is applied with a back pressure, the pressure is escaped from the release hole 135. Therefore, it is possible to suppress the foamed flux from expanding on the board. According to the flux applying apparatus 100, since it is possible to narrow the place to which the flux is to be applied, it is possible to apply the flux to a desired position.

When the foamed flux is attached to through-holes and the like of the board, it fills the entire through-holes by the capillary phenomenon. When the bubbles of the foamed flux filled in the through-holes get flat, a volume of the foamed flux decreases and a proper amount of the flux remains on surfaces of the through-holes. Thereby, it is possible to suppress the applied flux from falling below the board, as drops. Also, the surplus foamed flux is discharged from the release hole 135, so that the clean foamed flux is always supplied to the tip portion 134.

Modified Embodiments

In the flux applying apparatus 100 of the illustrative embodiment, the flux is circulated by the pressure of the gas, without using a pump. Therefore, a pump malfunction does not occur, so that it is possible to reduce the labor on the maintenance. In other illustrative embodiments of the disclosure, it is not necessarily required not to use the pump for circulation of the flux. In many flux applying apparatuses of the related art, the pump is used to circulate the flux. Even in the apparatuses, when a nozzle part is replaced with the nozzle 10 and the foaming pipe 110 of the disclosure and the pressurization/depressurization device 51 is added, it is possible to achieve the operations and effects equivalent to the foamed flux applying apparatus of the disclosure at minimum cost without updating the entire facility.

Although the illustrative embodiment of the disclosure has been described, the illustrative embodiment is just exemplary and the disclosure is not limited thereto. That is, a variety of changes can be made on the basis of knowledge of one skilled in the art, without departing from the gist of the claims.

What is claimed is:

1. A flux applying method, comprising:
   supplying a flux to a flux introduction portion of a nozzle;
   conveying the flux from the flux introduction portion of the nozzle to a foaming portion of the nozzle;
   supplying a gas to a foaming pipe with a porous filter in the foaming portion of the nozzle;
   jetting the gas from the porous filter of the foaming pipe to the flux in the foaming portion of the nozzle to produce a foamed flux, including jetting a first portion of the foamed flux through a foamed flux conveying portion and a tip portion of the nozzle to an outlet of the nozzle and jetting a second portion of the foamed flux through a release hole in the foamed flux conveying portion and along an exterior of the foamed flux conveying portion, the foaming portion, and the flux introduction portion.

2. The flux applying method according to claim 1, wherein jetting the gas from the porous filter of the foaming pipe includes stopping the supply of the flux.

3. The flux applying method according to claim 1, further comprising:
   controlling a height of the foamed flux relative to the nozzle by controlling supply of the flux and supply of the gas.

4. A flux applying apparatus configured to jet and apply a flux to a target, the flux applying apparatus comprising:
   a main tank configured to accommodate therein the flux;
   a piping configured to pass therethrough the flux which is to be transported from the main tank;
   a nozzle including:
      a flux introduction portion in fluid communication with the piping;
      a foaming portion in fluid communication with the flux introduction portion;
      a foamed flux conveying portion in fluid communication with the foaming portion;
      a tip portion in fluid communication with the foamed flux conveying portion; and
      a release hole disposed in the foamed flux conveying portion; and
   a foaming pipe in fluid communication with the nozzle and including a porous filter, the foaming pipe configured to jet a gas from the porous filter of the foaming pipe to the flux in the nozzle supplied via the piping to produce a foamed flux in the foaming portion of the nozzle, wherein the foamed flux is conveyed along the foamed flux conveying portion to the tip portion, the tip portion configured to discharge a first portion of the foamed flux, and
   wherein the release hole is configured to discharge a second, remaining portion of the foamed flux along an outside surface of the foamed flux conveying portion, the foaming portion, and the flux introduction portion.

5. The flux applying apparatus according to claim 4, wherein the tip portion of the nozzle includes a throttle hole configured to adjust an amount of the first portion of the foamed flux to be discharged.

6. The flux applying apparatus according to claim 4, further comprising:
   a base; and
   a sub-tank coupled to the base, the nozzle extending through the sub-tank, wherein the second, remaining portion of the foamed flux is discharged from the release hole along the outside of the foamed flux conveying portion, the foaming portion, and the flux introduction portion to be received in the sub-tank.

7. The flux applying apparatus according to claim 6, wherein the sub-tank includes an outer peripheral edge and a cover declined from the outer peripheral edge toward a center of the sub-tank to define an opening, the nozzle extending through the opening.

8. The flux applying apparatus according to claim 4, wherein the foaming pipe is coupled to the nozzle at the foaming portion of the nozzle, the porous filter disposed inside the nozzle and in fluid communication with the foaming portion of the nozzle.

9. The flux applying apparatus according to claim 4, wherein the release hole is disposed through a sidewall of the foamed flux conveying portion.

10. A flux applying apparatus, comprising:
    a main tank configured to store a flux;
    a pipe system in fluid communication with the main tank;
    a nozzle in fluid communication with the pipe system, including:
       a first portion in fluid communication with the pipe system and configured to receive the flux from the pipe system and main tank, the first portion having an exterior surface;

a second portion in fluid communication with the first portion and having an exterior surface; and a release hole disposed through the second portion;

a foaming pipe in fluid communication with the first portion of the nozzle and configured to jet a gas to the flux in the first portion of the nozzle to produce a foamed flux, wherein a first portion of the foamed flux is conveyed through the second portion of the nozzle with the second portion of the nozzle configured to discharge the first portion of the foamed flux, and wherein a second portion of die foamed flux is discharged it the release hole and along the exterior surface of the first and second portions of the nozzle; and a sub-tank configured to receive the second portion of the foamed flux, the nozzle extending through the sub-tank.

11. The flux applying apparatus of claim 10 wherein the first portion of the nozzle includes a flux introduction portion in fluid communication with the pipe system and a foaming portion in fluid communication with the flux introduction portion, the foaming pipe coupled to the nozzle at the foaming portion of the nozzle.

12. The flux applying apparatus of claim 11 wherein the foaming pipe further includes a porous filter positioned within the foaming portion of the nozzle.

13. The flux applying apparatus of claim 11 wherein the second portion of the nozzle includes a foamed flux conveying portion in fluid communication with the foaming portion and a tip portion in fluid communication with the foamed flux conveying portion, the tip portion configured to discharge the first portion of the foamed flux and the release hole disposed through the foamed flux conveying portion.

14. The flux applying apparatus of claim 13 wherein the second portion of the foamed flux is discharged along an exterior surface of the foamed flux conveying portion, the foaming portion, and the flux introduction portion.

* * * * *